United States Patent
Inagaki et al.

(10) Patent No.: US 9,331,332 B2
(45) Date of Patent: May 3, 2016

(54) NONAQUEOUS ELECTROLYTE BATTERY AND BATTERY PACK

(75) Inventors: Hiroki Inagaki, Yokohama (JP); Norio Takami, Yokohama (JP); Tetsuya Sasakawa, Yokohama (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 0 days.

(21) Appl. No.: 13/429,554

(22) Filed: Mar. 26, 2012

(65) Prior Publication Data

US 2012/0328930 A1    Dec. 27, 2012

(30) Foreign Application Priority Data

Jun. 23, 2011 (JP) ................................. 2011-139202

(51) Int. Cl.
| | |
|---|---|
| *H01M 4/131* | (2010.01) |
| *H01M 4/485* | (2010.01) |
| *H01M 4/36* | (2006.01) |
| *H01M 4/525* | (2010.01) |
| *H01M 10/0525* | (2010.01) |

(52) U.S. Cl.
CPC .............. *H01M 4/485* (2013.01); *H01M 4/131* (2013.01); *H01M 4/362* (2013.01); *H01M 4/525* (2013.01); *H01M 10/0525* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 2004/0131941 A1* | 7/2004 | Belharouak et al. | 429/231.95 |
| 2008/0032197 A1* | 2/2008 | Horpel et al. | 429/224 |
| 2010/0248038 A1* | 9/2010 | Takami et al. | 429/332 |
| 2011/0045328 A1 | 2/2011 | Inagaki et al. | |

FOREIGN PATENT DOCUMENTS

| | | | |
|---|---|---|---|
| CN | 102005604 A | 4/2011 | |
| JP | 2005-267940 | * 9/2005 | .............. H01M 4/58 |
| JP | 2008-34368 | 2/2008 | |
| JP | 2010-170799 A | 8/2010 | |
| WO | WO 2009/147315 A1 | 12/2009 | |

OTHER PUBLICATIONS

Machine translation of JP 2005-267940, retrieved from <http://www19.ipdl.inpit.go.jp/PA1/cgi-bin/PA1INDEX> on Mar. 17, 2015.*
"Battery Handbook", Ohm-Sha Ltd., 1$^{st}$ Edition, 2000, 3 pages.
Office Action issued Apr. 1, 2014, in Japanese Patent Application No. 2011-139202 with English translation.
Combined Chinese Office Action and Search Report issued Mar. 20, 2014, in Chinese Patent Application No. 201210082564.5 with English translation.
Damien Dambournet, et al., "MLi$_2$Ti$_6$O$_{14}$ (M=Sr, Ba, 2Na) Lithium Insertion Titanate Materials: A Comparative Study", Inorganic Chemistry, vol. 49, No. 6, Feb. 17, 2010, pp. 2822-2826.

* cited by examiner

*Primary Examiner* — Cynthia K Walls
(74) *Attorney, Agent, or Firm* — Oblon, McClelland, Maier & Neustadt, L.L.P.

(57) ABSTRACT

According to one embodiment, there is provided a nonaqueous electrolyte battery including a positive electrode, a negative electrode, and a nonaqueous electrolyte. The negative electrode includes a first negative electrode active material containing a monoclinic β-type titanium composite oxide and a second negative electrode active material. The second negative electrode active material causes insertion and release of lithium ion in a potential range from 0.8 V to 1.5 V (vs. Li/Li$^+$).

11 Claims, 6 Drawing Sheets

NONAQUEOUS ELECTROLYTE BATTERY AND BATTERY PACK

CROSS-REFERENCE TO RELATED APPLICATIONS

This application is based upon and claims the benefit of priority from prior Japanese Patent Application No. 2011-139202, filed Jun. 23, 2011, the entire contents of which are incorporated herein by reference.

FIELD

Embodiments described herein relate generally to a nonaqueous electrolyte battery and a battery pack.

BACKGROUND

Recently, a titanium oxide having a monoclinic β-type structure has attracted attention as an active material for nonaqueous electrolyte batteries. In a lithium titanate ($Li_4Ti_5O_{12}$) having spinel structure used for conventional nonaqueous electrolyte batteries, the number of lithium ions capable of being inserted is 3 per structural unit represented by $Li_4Ti_5O_{12}$.

Accordingly, the number of lithium ions capable of being inserted into $Li_4Ti_5O_{12}$ is ⅗ per one titanium ion. Therefore, 0.6 is theoretically a maximum value. On the other hand, in the titanium oxide having a monoclinic β-type structure, the maximum number of lithium ions capable of being inserted into the titanium oxide is 1.0 per one titanium ion. Thus, when such a titanium oxide is used as an active material for nonaqueous electrolyte batteries, the theoretical capacity reaches about 335 mAh/g. Consequently, it appears that the use of titanium oxide having a monoclinic β-type structure allows for development of high capacity batteries.

However, there is a problem such that cycle performance of a nonaqueous electrolyte battery using the titanium oxide having a monoclinic β-type structure is decreased under high temperature.

DETAILED DESCRIPTION

In general, according to one embodiment, there is provided a nonaqueous electrolyte battery including a positive electrode, a negative electrode, and a nonaqueous electrolyte. The negative electrode includes a first negative electrode active material containing a monoclinic β-type titanium composite oxide and a second negative electrode active material. The second negative electrode active material causes insertion and release of lithium ion in a potential range from 0.8 V to 1.5 V relative to metallic lithium.

First Embodiment

A nonaqueous electrolyte battery comprises a positive electrode, a negative electrode, and a nonaqueous electrolyte.

The positive electrode comprises a positive electrode current collector and a positive electrode layer (i.e. a layer containing positive electrode active material). The positive electrode layer comprises a positive electrode active material, a conductive agent, and a binder. The positive electrode layer is formed at one or both surfaces of the positive electrode current collector.

The negative electrode comprises a negative electrode current collector and a negative electrode layer (i.e. a layer containing negative electrode active material). The negative electrode layer comprises the first negative electrode active material, the second negative electrode active material, the conductive agent, and the binder. The negative electrode layer is formed at one or both surfaces of the negative electrode current collector.

The first negative electrode active material contains a monoclinic β-type titanium composite oxide.

The term "monoclinic β-type titanium composite oxide" used herein means a titanium composite oxide having a crystal structure of monoclinic titanium dioxide.

The second negative electrode active material causes insertion and release of lithium ion in a potential range from 0.8 V to 1.5 V relative to metallic lithium. Hereinafter, "relative to metallic lithium" is referred to as "vs $Li/Li^+$".

The present inventors have found that a battery using the monoclinic β-type titanium composite oxide as a negative electrode active material causes problems to be described below.

When the amount of the lithium ion inserted into the monoclinic β-type titanium composite oxide exceeds a definite amount at the end period of charge step, the insertion rate of lithium ions (diffusion rate) is rapidly decreased and the polarization becomes larger. As a result, the internal resistance of the battery is increased. On the other hand, the diffusion rate of the lithium ion is largely dependent on the temperature. Accordingly, a degree that the diffusion rate of the lithium ion is decreased at the end period of charge step largely depends on the temperature.

Figure 8:
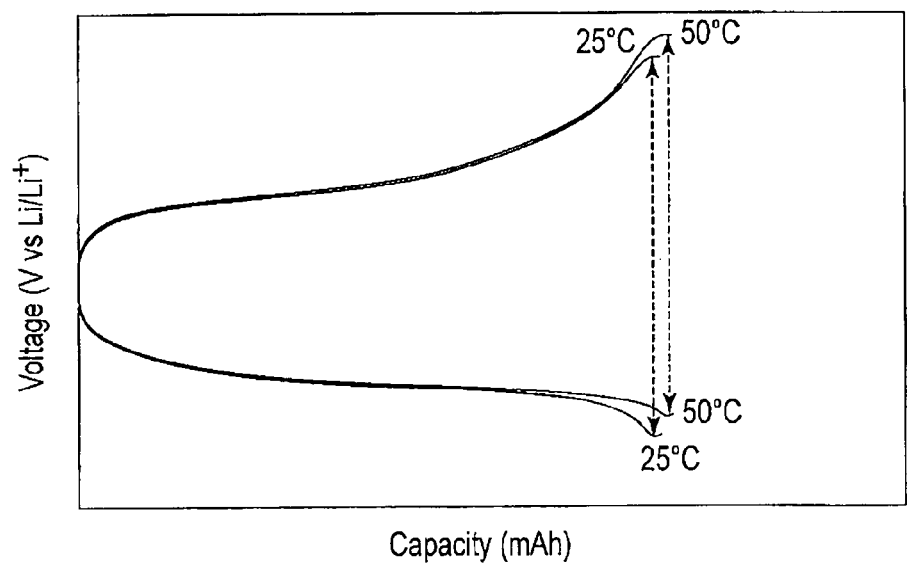
FIG. 8 shows charging curves of a battery in which only the first active material is comprised in a negative electrode.

FIG. 8 shows charging curves of the positive electrode and the negative electrode at 25° C. and 50° C. When the temperature is low, the diffusion rate of the lithium ion decreases at the end period of charge step. Therefore, the internal resistance increases, resulting in a decrease in the potential of the negative electrode. On the other hand, when the temperature is high, the degree of a decrease in the diffusion rate of the lithium ion is low. Therefore, the internal resistance does not increase too much and thus the potential of the negative electrode does not decrease too much. Therefore, as shown in FIG. 8, as the environmental temperature is higher, the negative electrode potential in a fully charged state becomes higher. Thus, as the environmental temperature is higher, the positive electrode potential becomes higher.

When a positive electrode material is exposed to a high potential at high temperatures, it is significantly deteriorated. Thus, in the battery using the monoclinic β-type titanium composite oxide, the deterioration of the positive electrode under high temperature is large. As a result, cycle performance of the battery under high temperature decreases. Particularly, in the case of a battery using a positive electrode material such as $LiCoO_2$ having a layer structure which has an lithium ion inserted potential as high as about 4 V, cycle performance is significantly reduced.

The second negative electrode active material comprised in the negative electrode has a lithium ion inserted potential lower than that of the monoclinic β-type titanium composite oxide. In the negative electrode comprising the first and second negative electrode active materials, lithium ions released from the positive electrode active material during charge are first inserted into the first negative electrode active material and then are inserted into the second negative electrode active material. In the discharge step, lithium ions are first released from the second negative electrode active material and then are released from the first negative electrode active material.

Figure 1:
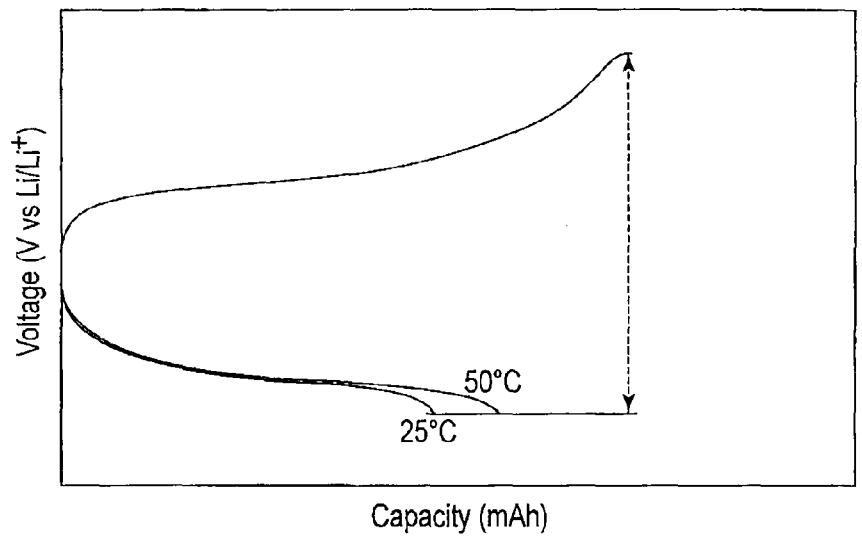
FIG. 1 shows charging curves of a battery in which a first active material and a second active material are comprised in a negative electrode.

FIG. 1 shows charging curves of a battery using a negative electrode comprising the first and second negative electrode active materials. After the start of charging, lithium ions are inserted into the first negative electrode active material and the potential is gradually lowered. However, when the amount of inserted lithium ions exceeds a definite amount, lithium ions are inserted into the second negative electrode active material and the potential of the negative electrode is kept constant. In such a battery, a potential of the negative electrode in the state of full charge is fixed by a potential of the second negative electrode active material. Accordingly, the potential is not influenced by the temperature and becomes constant. Therefore, the potential of the positive electrode is not increased even though it is placed under high temperature. Thus, the deterioration of the positive electrode can be prevented. As a result, the cycle performance can be improved.

As the second negative electrode active material, a metal oxide having lithium ion inserted potential of 0.8 to 1.5 V (vs $Li/Li^+$) is used. Such a metal oxide causes insertion and release of lithium ion in a potential range from 0.8 to 1.5 V (vs $Li/Li^+$). The material of which the potential is less dependent on the temperature and the charging curve is flat is preferably used as the second negative electrode active. When the lithium ion inserted potential of the second negative electrode active material is lower than 0.8 V (vs $Li/Li^+$), the charge-discharge reversibility of the monoclinic β-type titanium composite oxide may be reduced. Thus, the charge-discharge reversibility of the negative electrode may be reduced. When the lithium ion inserted potential of the second negative electrode active material is higher than 1.5 V (vs $Li/Li^+$), the capacity of the monoclinic β-type titanium composite oxide may not be sufficiently utilized. Therefore, the electric capacity of the negative electrode may be reduced.

The second negative electrode active material is preferably a transition metal-containing oxide selected from the group consisting of a titanium-containing oxide having a crystal structure belonging to a space group Cmca and an oxide containing one or more elements of Fe, Co, Ni, Cu, or Mo. These transition metal-containing oxides can be used preferably from the viewpoint of the action potential and charge-discharge reversibility.

The titanium-containing oxide having a crystal structure belonging to a space group Cmca has a lithium ion inserted potential of 1.2 to 1.5 V (vs $Li/Li^+$). The titanium-containing oxide represented by the formula of $Li_{2+x}A_yTi_6O_{14}$ is preferred. Here, A represents at least one element selected from the group consisting of Na, K, Mg, Ca, Ba, and Sr. x and y satisfy relationships represented by inequalities of $0 \leq x \leq 5$ and $1 \leq y \leq 2$, respectively.

An oxide containing one or more elements of Fe, Co, Ni, Cu, and Mo is preferably a molybdenum oxide having an lithium ion inserted potential of 1.0 to 1.5 V (vs $Li/Li^+$). The molybdenum oxide represented by the formula of $Li_xMoO_y$ is preferred. Here, x and y satisfy relationships represented by inequalities of $0 \leq x \leq 2$ and $1.9 \leq y \leq 2.1$, respectively.

The molybdenum oxide represented by the formula of $Li_xMoO_y$ ($0 \leq x \leq 2$, $1.9 \leq y \leq 2.1$) preferably has a crystal structure belonging to a space group ($P2_1/C$). As for such a molybdenum oxide, charging and discharging are advanced by a one-electron reaction of molybdenum (change from $Mo^{4+}$ to $Mo^{3+}$ or the reverse change). The molybdenum oxide has a theoretical capacity of 210 mAh/g. In the one-electron reaction which is occurred when x is in the range of 0 to 1, the molybdenum oxide exhibits two flat portions in charging-discharging curve. The boundary between the two flat portions is a point that x is 0.5. The potentials at the two flat portions are about 1.3 V (vs $Li/Li^+$) and about 1.6 V (vs $Li/Li^+$), respectively. Lithium ion is inserted into and released from the molybdenum oxide when x is 0.5 or more and 1 or less, namely, when the potential is about 1.6 V (vs $Li/Li^+$). Therefore, the molybdenum oxide can be used as the second negative electrode active material. Regarding the charge-discharge curve (when the counter electrode is Li metal) of $MoO_2$, it should be referred to, for example, "Battery Handbook" (1st ed.), pp. 417 and 418, published by Ohm-Sha Ltd., 2000.

The described above, a metal oxide causing insertion and release of a definite amount of lithium ion in a potential range from 0.8 to 1.5 V (vs $Li/Li^+$) is used as the second negative electrode active material. The definite amount is preferably 20 mAh/g or more, more preferably 50 mAh/g or more in the above potential range.

A ratio A/B of a mass A of the first negative electrode active material to a mass B of the second negative electrode active material in the negative electrode is preferably in the range of 1 to 100. A ratio A/B of 1 or more can prevent a decrease in the negative electrode capacity or charge-discharge reversibility. When the ratio A/B is 100 or less, the stability of the negative electrode potential at the end period of charge step can be obtained. The ratio A/B is more preferably in the range of 1 to 20.

The ratio A/B can be measured by an X-ray diffraction method. Specifically, the negative electrode layer containing the negative electrode active material is peeled from the negative electrode current collector and is set on a measurement jig of an X-ray diffractometer. Subsequently, an X-ray diffraction pattern is obtained using Cu-Kα rays. As the X-ray diffractometer, for example, M18XHF22-SRA from MAC Science Co., Ltd., can be used. The obtained X-ray diffraction pattern is analyzed using, for example, RIETAN (trade name) analysis software. The ratio A/B can be calculated using the results.

In the nonaqueous electrolyte battery according to the embodiment, it is preferable that the capacity per unit area of the negative electrode is larger than that of the positive electrode. Such a configuration allows the life performance of the battery to be improved. A ratio of the capacity per unit area of the negative electrode to the capacity per unit area of the positive electrode (negative electrode capacity/positive electrode capacity) is preferably 1.01 or more.

Hereinafter, the nonaqueous electrolyte secondary battery of this embodiment will be described with reference to the drawings. The same reference numerals denote common portions throughout the embodiments and overlapped description is not repeated. Each drawing is a pattern diagram to facilitate the description of the embodiments and its understanding. The shape, size, and ratio thereof are different from those of an actual device. However, they can be appropriately designed and modified by taking into consideration the following description and known techniques.

Figure 2:
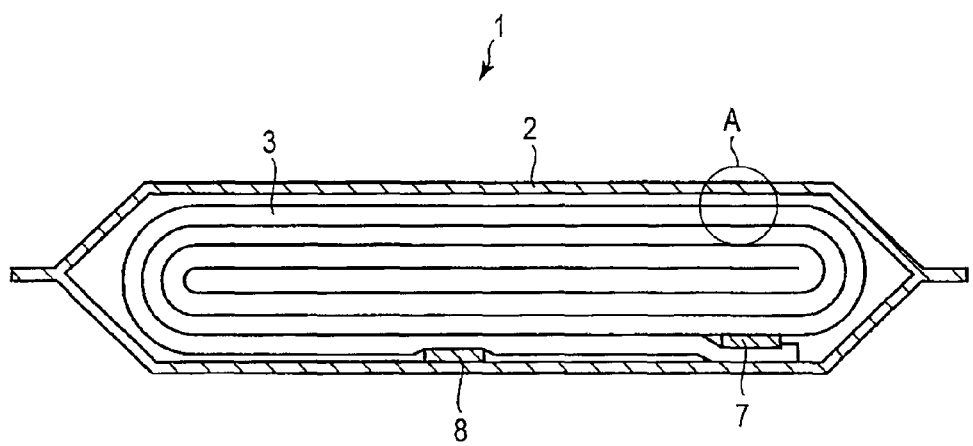
FIG. 2 is a cross-sectional view of a nonaqueous electrolyte secondary battery according to a first embodiment.
Figure 3:
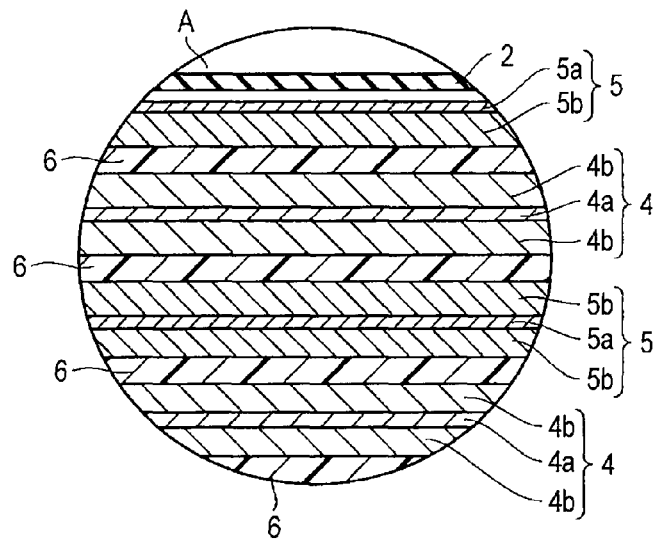
FIG. 3 is an enlarged sectional view of a portion A in FIG. 2.

FIG. 2 shows an example of the nonaqueous electrolyte battery according to this embodiment. FIG. 2 is a cross-sectional diagram of a flat-type nonaqueous electrolyte secondary battery. FIG. 3 is an enlarged sectional view of a portion A in FIG. 2. A battery 1 comprises a container 2, a wound electrode group 3 with a flat shape, a positive electrode terminal 7, a negative electrode terminal 8, and a nonaqueous electrolyte.

The container 2 has baggy shape. The container 2 is made of a laminate film. The wound electrode group 3 is accommodated in the container 2. The wound electrode group 3 comprises a positive electrode 4, a negative electrode 5, and a separator 6 as shown in FIG. 3. The wound electrode group 3 is formed by spirally winding a laminated product obtained by laminating the negative electrode 5, the separator 6, the positive electrode 4, and the separator 6 in this order from the outside and press molding the resultant product.

The positive electrode 4 comprises a positive electrode current collector 4a and a positive electrode layer 4b. The positive electrode layer 4b comprises the positive electrode active material. The positive electrode layer 4b is formed at each surface of the positive electrode current collector 4a.

As the positive electrode active material, various oxides, sulfides, and polymers can be used.

Examples of the oxides include lithium ion inserted manganese dioxide ($MnO_2$), iron oxide, copper oxide, and nickel oxide, and lithium manganese composite oxides (e.g., $Li_xMn_2O_4$ or $Li_xMnO_2$), lithium nickel composite oxides (e.g., $LixNiO_2$), lithium cobalt composite oxides ($Li_xCoO_2$), lithium nickel cobalt composite oxides (e.g., $LiNi_{1-y}Co_yO_2$), lithium manganese cobalt composite oxides (e.g., $LiMn_yCo_{1-y}O_2$), lithium manganese nickel composite oxides having a spinel structure ($Li_xMn_{2-y}Ni_yO_4$), lithium phosphorus oxides having an olivine structure ($Li_xFePO_4$, $Li_xFe_{1-y}Mn_yPO_4$, and $Li_xCoPO_4$), iron sulfate ($Fe_2(SO_4)_3$), vanadium oxides (e.g., $V_2O_5$), and lithium nickel cobalt manganese composite oxides. In the formula above, x and y are preferably from 0 to 1.

Examples of oxides for providing a high positive electrode voltage include lithium manganese composite oxides ($Li_xMn_2O_4$), lithium nickel composite oxides ($Li_xNiO_2$), lithium cobalt composite oxides ($Li_xCoO_2$), lithium nickel cobalt composite oxides ($LiNi_{1-y}Co_yO_2$), lithium-manganese-nickel composite oxides having a spinel structure ($Li_xMn_{2-y}Ni_yO_4$), lithium manganese cobalt composite oxides ($Li_xMn_yCo_{1-y}O_2$), lithium iron phosphate ($Li_xFePO_4$), and lithium nickel cobalt manganese composite oxides. In the formula above, x and y are preferably from 0 to 1.

From the viewpoint of cycle performance, it is preferable to use a lithium composite oxide containing nickel. Particularly, a lithium nickel cobalt manganese composite oxide represented by the composition formula of $Li_aNi_bCo_cMn_dO_2$ ($0 \leq a \leq 1.1$, $0.1 \leq b \leq 0.5$, $0 \leq c \leq 0.9$, $0.1 \leq d \leq 0.5$) is preferred because of high thermal stability.

An oxide having a layer structure is liable to deteriorate because the layer structure is liable to break at the state of overcharging. Further, an oxide containing lithium and nickel is liable to deteriorate at the state of over-charge. Therefore, when those oxides are used as positive electrode active materials, effects of this embodiment are markedly obtained.

The battery having high-voltage can be provided by using a lithium-manganese-nickel composite oxide having a spinel structure as the positive electrode active material. Alternatively, the nonaqueous electrolyte battery excellent in thermal stability can be realized by containing a lithium phosphorus composite oxide having an olivine structure in the positive electrode active material (e.g., $Li_xFePO_4$, $Li_xFe_{1-x}Mn_yPO_4$, $Li_xVPO_4F$, $Li_xCoPO_4$, wherein $0 \leq x \leq 1$, $0 \leq y \leq 1$).

Particularly, when a nonaqueous electrolyte comprising an ionic liquid is used, it is preferable to use lithium iron phosphate, $Li_xVPO_4F$, lithium manganese composite oxides, lithium nickel composite oxides, and/or lithium nickel cobalt composite oxides from the viewpoint of cycle life. This is because the reactivity of the positive electrode active material and the ionic liquid is reduced.

As the positive electrode active material, a lithium metal oxide represented by the formula of $xLi_2MeO_3$-$(1-x)LiMe'O_2$ can be used. In the formula, x satisfies the relationship represented by the inequality of $0 \leq x \leq 1$, and Me and Me' independently represent at least one element selected from the group consisting of Mn, Ti, Zr, V, Cr, Fe, Co, Ni, Cu, Al, Mg, Zr, B, and Mo.

Such a lithium metal oxide has high action potential. When it is exposed to an overcharged condition, the reaction with an electrolytic solution is proceeded, resulting in significant deterioration. Therefore, when such a positive electrode active material is used, effects of this embodiment are markedly obtained.

Organic materials and inorganic materials, for examples, conductive polymer materials such as polyaniline or polypyrrole; disulfide-based polymer materials; sulfur (S); and carbon fluoride can be used as the positive electrode active material.

As the positive electrode active material, the above-described compounds can be used alone or in combination therewith.

The primary particle diameter of the positive electrode active material is preferably 100 nm or more and 1 μm or less. If it is 100 nm or more, the handling in the industrial production is made easy. If it is 1 μm or less, diffusion in solid of lithium ions can be smoothly proceeded.

The specific surface area of the positive electrode active material is preferably 0.1 $m^2/g$ or more and 10 $m^2/g$ or less. If it is 0.1 $m^2/g$ or more, the insertion site of lithium ions can be sufficiently ensured. If it is 10 $m^2/g$ or less, the handling in the industrial production is made easy and good charge and discharge cycle performance can be ensured.

The conductive agent is used to improve the current collection performance and suppress the contact resistance with the collector. Examples of the conductive agent include carbonaceous materials such as acetylene black, carbon black, or graphite.

The binder is used to bind the conductive agent to the active material. Examples of the binder include polytetrafluoroethylene (PTFE), polyvinylidene fluoride (PVdF), and fluorine-based rubber.

The compounding ratio of the positive electrode active material, the positive electrode conductive agent, and the binder is preferably from 80% by mass to 95% by mass, from 3% by mass to 18% by mass, and from 2% by mass to 17% by mass, respectively. When the content of the positive electrode conductive agent is 3% by mass or more, the above effects can be exerted. When the content is 18% by mass or less, decomposition of the nonaqueous electrolyte on the surface of the positive electrode conductive agent under high temperature storage can be reduced. If the content of the binder is 2% by mass or more, sufficient electrode strength is obtained. If the content is 17% by mass or less, the blending amount of the insulator of the electrode can be decreased and the internal resistance can be reduced.

The positive electrode current collector is preferably aluminum foil or aluminum alloy foil. The average crystal grain size is preferably 50 μm or less, more preferably 30 μm or less, still more preferably μm or less. When the average crystal grain size is 50 μm or less, the strength of the aluminum foil or aluminum alloy foil can be dramatically increased. Thus, it becomes possible to densify the positive electrode by high pressure and the capacity of the battery can be increased.

The average crystal grain size of the aluminum foil or aluminum alloy foil is intricately influenced by a plurality of factors such as structures of materials, impurities, processing conditions, heat treatment histories, and annealing conditions. The average crystal grain size is adjusted to 50 μm or less by combining the above-described various-factors during a production process.

The average crystal grain size is calculated as follows. The structure of the surface of the collector is observed with an optical microscope and a crystal grain number n spread in a region of 1 mm×1 mm is obtained. An average crystal grain size area S is calculated from $S=1\times10^6/n$ (μm$^2$) using the number n.

An average crystal grain size d (μm) is calculated from the obtained value of S by Formula (I) below.

$$d=2(S/\pi)^{1/2} \quad (I)$$

The thickness of the aluminum foil and the aluminum alloy foil is preferably 20 μm or less, more preferably 15 μm or less. The purity of the aluminum foil is preferably 99% by mass or more. Preferable examples of the aluminum alloy include alloys containing elements, such as Mg, Zn, or Si. On the other hand, the content of transition metals such as Fe, Cu, Ni, or Cr is preferably 1% by mass or less.

The positive electrode can be produced by, for example, the following method. First, a positive electrode active material, a conductive agent, and a binder are suspended in a solvent to prepare slurry. The slurry is applied to one or both surfaces of a positive electrode current collector, followed by drying to form a positive electrode layer. Thereafter, the resultant layer is pressed. Alternatively, a pellet is formed from the positive electrode active material, the conductive agent, and the binder. The pellet is used as the positive electrode layer.

The negative electrode 5 comprises a negative electrode current collector 5a and a negative electrode layer 5b. The negative electrode layer 5b comprises a negative electrode active material. In the outermost negative electrode 5, the negative electrode layer 5b is formed on the only inner surface of the negative electrode current collector 5a. In other portions, the negative electrode layer 5b is formed at both surface of the negative electrode current collector 5a.

In the negative electrode layer 5b, the first negative electrode active material and the second negative electrode active material are present in a mixture state. The state of the first negative electrode active material and the second negative electrode active material can be confirmed by peaks by powder X-ray diffraction measurement. When the first negative electrode active material and the second negative electrode active material are in a mixed state, a peak derived from the first negative electrode active material and a peak derived from the second negative electrode active material can be detected.

The first negative electrode active material contains the monoclinic β-type titanium composite oxide. The use of the monoclinic β-type titanium composite oxide allows a high negative electrode capacity to be obtained.

As the second negative electrode active material, a substance causing insertion and release of lithium ion in a potential range from 0.8 to 1.5 V (vs Li/Li$^+$) is used. Examples thereof include transition metal-containing oxides containing at least one element selected from the group consisting of Fe, Co, Ni, Cu, and Mo and titanium-containing oxides having a crystal structure belonging to a space group Cmca. Particularly, molybdenum oxide is preferably used. These oxides have good cycle performance and show little capacity deterioration, and thus they are preferred.

Preferable examples of the second negative electrode active material includes oxides represented by the formula of $Li_xMoO_y$ (0≤x≤2, 1.9≤y≤2.1) and oxides which have a crystal structure belonging to a space group Cmca and are represented by the formula of $Li_{2+x}A_yTi_6O_{14}$. Here, A represents at least one element selected from the group consisting of Na, K, Mg, Ca, Ba, and Sr, and x and y satisfy relationships represented by inequalities of 0≤x≤5 and 1≤y≤2, respectively. These oxides can be preferably used from the viewpoint of the action potential and charge-discharge reversibility.

The first and second negative electrode active materials may contain lithium ion in advance. Alternatively, lithium ion may be contained in them by charging the battery.

A ratio A/B of a mass A of the first negative electrode active material to a mass B of the second negative electrode active material in the negative electrode is preferably in a range from 1 to 100, more preferably from 1 to 20. The ratio A/B is calculated based on the results obtained by measuring the mass contents of the first and second negative electrode active materials per unit area of the negative electrode.

In the nonaqueous electrolyte battery in this embodiment, it is preferable that a molybdenum oxide or a lithium-titanium composite oxide is used as the second negative electrode active material, and a lithium metal oxide represented by the formula of $xLi_2MeO_3$-$(1-x)LiMe'O_2$ is used as the positive electrode active material, and the ratio A/B is in the range from 1 to 20.

When the average particle diameter of the monoclinic β-type titanium composite oxide is too large, large current performance is decreased, and thus it is preferably 3 μm or less. The lower limit of the average particle diameter of the monoclinic β-type titanium composite oxide is not particularly limited. However, the battery performance is decreased significantly when an average primary particle diameter (in the case of the fiber particle, an average fiber diameter) of the monoclinic β-type titanium composite oxide is 0.03 μm or more. This is because when the particle diameter of the monoclinic g-type titanium composite oxide becomes larger, the temperature dependence of the lithium ion diffusion rate has a serious influence on the performance. Accordingly, the average particle diameter can be set to 0.03 μm or more.

When the specific surface area of the monoclinic β-type titanium composite oxide is measured by the BET adsorption method by $N_2$ adsorption, it is preferably from 5 to 50 m$^2$/g. If the specific surface area is in the above range, the rate of utilization of the monoclinic β-type titanium composite oxide can be increased, and substantially higher capacity can be obtained in high-rate charge-discharge.

The porosity of the negative electrode (except for the current collector) is preferably in a range of 20 to 50%. Thus, a negative electrode having an excellent affinity for the nonaqueous electrolyte and a high-density can be obtained. The porosity of the negative electrode is more preferably in a range or 25 to 40%.

The negative electrode current collector is preferably aluminum foil or aluminum alloy foil. The average crystal grain size is preferably 50 μm or less, more preferably 30 μm or less, still more preferably 5 μm or less. Accordingly, the strength of the collector can be dramatically increased. Thus, the negative electrode can be densified by high pressure and the capacity of the battery can be increased.

Further, since the dissolution and corrosive deterioration of the negative electrode current collector in the state of overdischarge under high temperature (at 40° C. or more) can be prevented, an increase in negative electrode impedance can be suppressed. Further, output performance, rapid charging, and charge and discharge cycle performance can be improved. The method of adjusting the average crystal grain size and the method of measuring the same are as discussed in the section on the positive electrode.

The thickness of the aluminum foil and the aluminum alloy foil is preferably 20 μm or less, more preferably 15 μm or less. The purity of the aluminum foil is preferably 99% by mass or more. Preferable examples of the aluminum alloy include alloys containing elements, such as Mg, Zn, or Si. On the other hand, the content of transition metals such as Fe, Cu, Ni, or Cr is preferably 1% by mass or less.

As the conductive agent, for example, a carbon material can be used. Examples of the carbon material include acetylene black, carbon black, corks, carbon fiber, and graphite. Other examples thereof include metal powder such as aluminum powder or conductive ceramics such as TiO. Corks with a heat treatment temperature of 800 to 2000° C. and an average particle diameter of 10 μm or less, graphite, powder of TiO, or carbon fiber with an average particle diameter of 1 μm or less are preferred. The BET specific surface area, based on $N_2$ adsorption, of those carbon materials is preferably 10 $m^2/g$ or more.

Examples of the binder include polytetrafluoroethylene (PTFE), polyvinylidene fluoride (PVdF), fluorine rubber, styrene butadiene rubber, and a core shell binder.

The compounding ratio of the negative electrode active material, the negative electrode conductive agent, and the binder is preferably from 70% by mass to 96% by mass, from 2% by mass to 28%, from 2% by mass to 28 by mass, respectively. When the amount of the negative electrode conductive agent is less than 2% by mass, the current collection performance of the negative electrode layer is lowered and large current performance of the nonaqueous electrolyte secondary battery may be reduced. When the content of the binder is less than 2% by mass, the binding property of the negative electrode layer and the negative electrode current collector is lowered and cycle performance may be reduced. On the other hand, from the viewpoint of performance of high capacity, each contents of the negative electrode conductive agent and the binder is preferably 28% by mass.

The negative electrode can be produced by, for example, the following method. First, a negative electrode active material, a conductive agent, and a binder are suspended in a solvent to prepare slurry. The slurry is applied to one or both surfaces of a negative electrode current collector, followed by drying to form a negative electrode layer. Thereafter, the resultant layer is pressed. Alternatively, a pellet is formed from the negative electrode active material, the conductive agent, and the binder. The pellet is used as the negative electrode layer.

As the separator, a porous film made from materials such as polyethylene, polypropylene, cellulose, or polyvinylidene fluoride (PVdF), a synthetic resin nonwoven fabric or the like can be used. A porous film made of polyethylene or polypropylene melts at a certain temperature and can block electric current, and thus it is preferred from the viewpoint of improvement in safety.

As shown in FIG. 2, near the peripheral edge of the wound electrode group 3, the band-shaped positive electrode terminal 7 is connected to the positive electrode current collector 4a. The band-shaped negative electrode terminal 8 is connected to the negative electrode current collector 5a at the outermost layer of the wound electrode group. The positive electrode terminal 7 and the negative electrode terminal 8 are extended to outside through an opening of the container 2.

The positive electrode terminal 7 is made of, for example, a material having electric stability and conductivity in a potential range from, preferably, 3 to 5 V (vs $Li/Li^+$). Specific examples of these materials include aluminum and aluminum alloys containing elements such as Mg, Ti, Zn, Mn, Fe, Cu or Si. The positive electrode terminal is preferably made of the same material as the positive electrode current collector to reduce the contact resistance with the positive electrode current collector.

The negative electrode terminal 8 is made of, for example, a material having electric stability and conductivity in a potential range of 0.3 to 3 V (vs $Li/Li^+$). Specifically, examples of these materials include aluminum and aluminum alloys containing elements such as Mg, Ti, Zn, Mn, Fe, Cu, or Si. The negative electrode terminal is preferably made of the same material as the negative electrode current collector to reduce the contact resistance with the negative electrode current collector.

Further, the nonaqueous electrolyte is injected into the container 2. The opening of the container 2 is heat-sealed in a state that the positive electrode terminal 7 and the negative electrode terminal 8 are sandwiched, thereby the wound electrode group 3 and the nonaqueous electrolyte are completely sealed.

As the nonaqueous electrolyte, a liquid nonaqueous electrolyte or gel-like nonaqueous electrolyte can be used. The liquid nonaqueous electrolyte can be prepared by dissolving an electrolyte in an organic solvent. The gel-like nonaqueous electrolyte can be prepared by forming a composite of a liquid electrolyte and a polymer material.

The nonaqueous electrolyte preferably contains a noninflammable ionic liquid having no volatility.

The concentration of the electrolyte in the liquid nonaqueous electrolyte is preferably from 0.5 mol/L to 2.5 mol/L.

Examples of the electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethasulfonate ($LiCF_3SO_3$), bistrifluoromethylsulfonylimide lithium [$LiN(CF_3SO_2)_2$]. These electrolytes can be used singly or in combinations of two or more. The electrolyte is preferably one which is not easily oxidized even at a high potential and $LiPF_6$ is the most preferable.

Examples of the organic solvent include cyclic carbonates such as propylene carbonate (PC), ethylene carbonate (EC), and vinylene carbonate; chain carbonates such as diethyl carbonate (DEC), dimethyl carbonate (DMC), and methylethyl carbonate (MEC); cyclic ethers such as tetrahydrofuran (THF), 2-methyltetrahydrofuran (2MeTHF), and dioxolane (DOX); chain ethers such as dimethoxyethane (DME) and diethoethane (DEE); and γ-butyrolactone (GBL), acetonitrile (AN), and sulfolane (SL).

These organic solvents can be used singly or in combinations of two or more. A mixed solvent of two or more selected from the group of propylene carbonate (PC), ethylene carbonate (EC), and γ-butyrolactone (GBL), is preferred.

A more preferable organic solvent is γ-butyrolactone (GBL). The reason is as follows.

A first reason is that γ-butyrolactone, propylene carbonate, and ethylene carbonate have a high boiling point and flash point and are excellent in thermal stability.

A second reason is that lithium ion is inserted into and released from the lithium-titanium composite oxide in a potential region near 1.5 V (vs. Li/Li⁺). However, in the potential region, reduction decomposition of the nonaqueous electrolyte hardly occurs, and a coating which is formed from a reduction product of the nonaqueous electrolyte is hardly formed on the surface of the lithium-titanium composite oxide. Thus, when a battery is stored in the lithium-inserted state (i.e., a charged state), lithium ions inserted into the lithium-titanium composite oxide are gradually diffused in an electrolytic solution and a so-called self-discharge is caused. Self-discharge appears significantly, when the battery is stored under a high temperature.

The γ-butyrolactone is easily reduced as compared with chain or cyclic carbonates. Specifically, the preferential order of reduction is as follows: γ-butyrolactone>>>ethylene carbonate>propylene carbonate>>dimethyl carbonate>methylethyl carbonate>diethyl carbonate. It is shown that as the number of the mark > is large, there is a difference in reactivity between solvents.

Therefore, when γ-butyrolactone is contained in an electrolytic solution, a good coating can be formed on the surface of the lithium-titanium composite oxide in the operating potential region of the lithium-titanium composite oxide. As a result, the self-discharge can be suppressed, and high temperature storage performance of the nonaqueous electrolyte battery can be improved. The reason also applied to the above-described mixed solvent.

When the ionic liquid which is easily reduced is used, the same effect is obtained by containing γ-butyrolactone. Since the ionic liquid is easily oxidized, it has an effect on the positive electrode and improving the suppression of self-discharge and the cycle life.

In order to form an excellent protective film, the content of γ-butyrolactone to an organic solvent is set to preferably from 40% by volume to 95% by volume.

Examples of the polymer material include polyvinylidene fluoride (PVdF), polyacrylonitrile (PAN), and polyethylene oxide (PEO).

Subsequently, the nonaqueous electrolyte containing an ionic liquid will be described.

The ionic liquid means a salt in which at least a part of the salt exhibits a liquid form at an ordinary temperature. The ordinary temperature means a temperature range in which the power source is assumed to be normally operated. As for the temperature range in which the power source is assumed to be normally operated, the upper limit is about 120° C., in some cases about 60° C. The lower limit is about −40° C., in some cases about −20° C. Especially, a range of −20 to 60° C. is suitable.

As the ionic liquid containing lithium ions, an ionic melt comprised of a lithium ion, an organic cation, and an anion is preferably used. The ionic melt preferably remains in a liquid form even at room temperature or less.

Examples of the organic cation include an alkyl imidazolium ion having a skeleton shown in Formula (II) below and a quaternary ammonium ion shown in Formula (III).

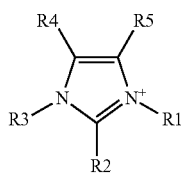

formula (II)

In the formula, R1 and R3 represent an alkyl group having 1 to 6 carbon atoms, respectively, and R2, R4, and R5 represent either a hydrogen atom or an alkyl group having 1 to 6 carbon atoms, respectively.

formula (III)

Preferable examples of the alkylimidazolium ion include dialkylimidazolium ion, trialkylimidazolium ion, and tetraalkylimidazolium ion. As the dialkylimidazolium ion, 1-methyl-3-ethylimidazolium ion (MEI⁺) is preferred. As the trialkylimidazolium ion, 1,2-diethyl-3-propylimidazolium ion (DMPI⁺) is preferred. As the tetraalkylimidazolium ion, 1,2-diethyl-3,4(5)-dimethylimidazolium ion is preferred.

Preferable examples of the quaternary ammonium ion include tetraalkylammonium ion and cyclic ammonium ion. Preferable examples of the tetraalkylammonium ion include dimethylethylmethoxyammonium ion, dimethylethylmethoxymethylammonium ion, dimethylethylethoxyethylammonium ion, and trimethylpropylammonium ion.

The melting point can be adjusted to 100° C. or less, more preferably 20° C. or less by using the alkylimidazolium ion or the quaternary ammonium ion (particularly, tetraalkylammonium ion). Furthermore, the reactivity with the negative electrode can be made low.

The concentration of the lithium ion is preferably mol % or less. It is more preferably from 1 mol % to mol %. If it is set within the range, a liquefied ionic liquid is easily formed even at a low temperature of 20° C. or less. Further, the viscosity can be made low and the ionic conductivity can be made high even at an ordinary temperature or less.

It is preferable to allow the above anion to be coexistent with at least one anion selected from $BF_4^-$, $PF_6^-$, $AsF_6^-$, $ClO_4^-$, $CF_3SO_3^-$, $CF_3COO^-$, $CH_3COO^-$, $CO_3^{2-}$, $N(CF_3SO_2)_2^-$, $N(C_2F_5SO_2)_2^-$, and $(CF_3SO_2)_3C^-$. When a plurality of anions are coexistent, an ionic liquid having a melting point of 20° C. or less can be easily formed. More preferably, an ionic liquid having a melting point of 0° C. or less is formed. More preferable examples of the anion include $BF_4^-$, $CF_3SO_3^-$, $CF_3COO^-$, $CH_3COO^-$, $CO_3^{2-}$, $N(CF_3SO_2)_2^-$, $N(C_2F_5SO_2)_2^-$, and $(CF_3SO_2)_3C^-$. An ionic liquid can be easily formed at 0° C. or less by containing these anions.

As the container, a baggy container formed of a laminate film or a metal container is used.

Examples of the shape of the container include a flat type (thin type), angular type, cylinder type, coin type and button type sheet-type, lamination-type shapes. The container having a size corresponding to the dimensions of a battery are used. For example, containers for small-sized batteries to be mounted on portable electronic devices and containers for large-sized batteries to be mounted on, for example, two- to four-wheel vehicles are also used.

As the laminate film, a multilayer film prepared by interposing a metal layer between resin layers may be used. The metal layer is preferably formed of an aluminum foil or aluminum alloy foil to reduce the weight of the battery. For example, polymer materials such as polypropylene (PP), polyethylene (PE), nylon or polyethylene terephthalate (PET) may be used for the resin layer. The laminate film can be molded into a desired shape by sealing through thermal fusion.

The thickness of the laminate film is preferably 0.2 mm or less.

The metal container may be made of aluminum, an aluminum alloy or the like. The aluminum alloy is preferably an alloy containing one or more elements selected from Mg, Zn, or Si. When the alloy contains transition metals such as Fe, Cu, Ni or Cr, the amount of the transition metals is preferably 1% by mass or less. Thus, the long-term reliability under the high temperature and heat releasing property can be dramatically improved.

A metal container comprised of aluminum or an aluminum alloy has preferably an average crystal grain size of 50 μm or less, more preferably 30 μm or less, still more preferably 5 μm or less. When the average crystal grain size is 50 μm or less, the strength of the metal container can be dramatically increased, which allows the container to be thinner. As a result, a battery being light, having high output and long-term reliability, and being suitable to be mounted on vehicles can be provided. The metal container preferably has a thickness of 0.5 mm or less, more preferably 0.2 mm or less.

Figure 4:
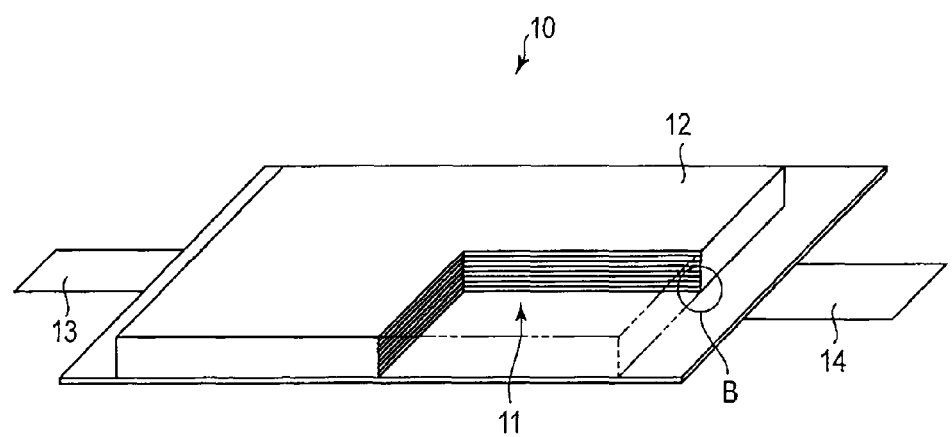
FIG. 4 is a partially cut perspective view of a nonaqueous electrolyte secondary battery according to another embodiment.
Figure 5:
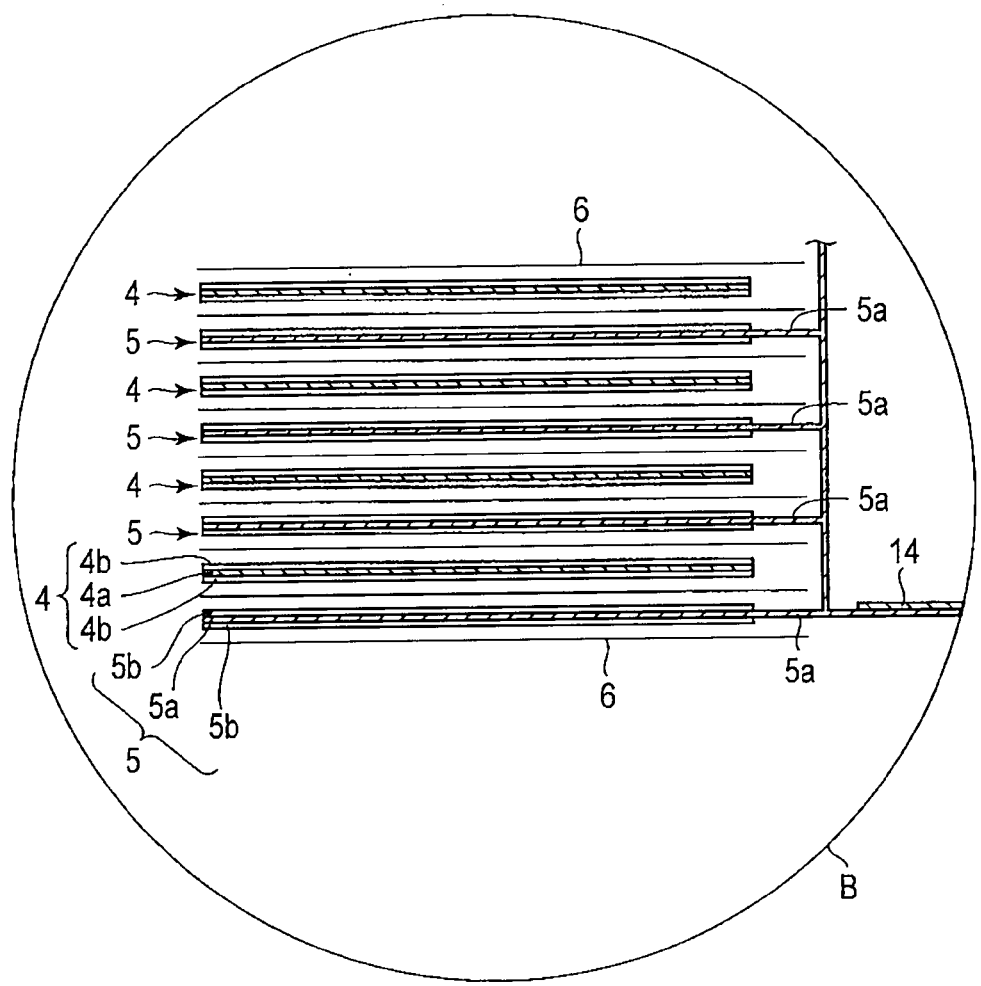
FIG. 5 is an enlarged sectional view of a portion B in FIG. 4.

FIGS. 4 and 5 show other examples of the nonaqueous electrolyte battery according to this embodiment. FIG. 4 is a partially cut perspective view of a flat-type nonaqueous electrolyte secondary battery in another embodiment. FIG. 5 is an enlarged view of a portion B of FIG. 4. A battery 10 comprises a lamination-type electrode group 11, a container 12, a positive electrode terminal 13, a negative electrode terminal 14, and a nonaqueous electrolyte.

The lamination-type electrode group 11 is accommodated in the container 12 made of a laminated film. As for the lamination-type electrode group 11, as shown in FIG. 5, a laminate is formed by inserting a separator 6 between the positive electrode 4 and the negative electrode 5 and alternately laminating them.

A plurality of the positive electrodes 4 are present and they comprise the positive electrode current collector 4a and a positive electrode layer 4b formed at each surface of the positive electrode current collector 4a. A plurality of the negative electrodes 5 are present and they comprise the negative electrode current collector 5a and a negative electrode layer 5b formed at each surface of the negative electrode current collector 5a.

One side of the each negative electrode current collectors 5a is protruded from the laminate and connected to the band-shaped negative electrode terminal 14. Similarly, not illustrated, one side of the each positive electrode current collectors 4a is protruded from the laminate at the opposite side which the negative electrode current collector 5a is protruded from the laminate. The positive electrode current collectors 4a are connected to the band-shaped positive electrode terminal 13.

The end of the negative electrode terminal 14 is externally drawn out of the container 12. The end of the positive electrode terminal 13 is positioned opposite to the negative electrode terminal 14 and externally drawn out the container 12.

Further, the nonaqueous electrolyte is injected into the container 12.

According to the embodiment described above, there can be provided a nonaqueous electrolyte battery having improved charge and discharge cycle performance without impairing the discharge capacity.

Second Embodiment

Subsequently, a battery pack according to a second embodiment will be explained with reference to the drawings. The battery pack comprises one or two or more of the above nonaqueous electrolyte batteries (unit cells) according to the second embodiment. When the battery pack includes two or more unit cells, these unit cells are disposed in such a manner that they are electrically connected in series or in parallel.

Figure 6:
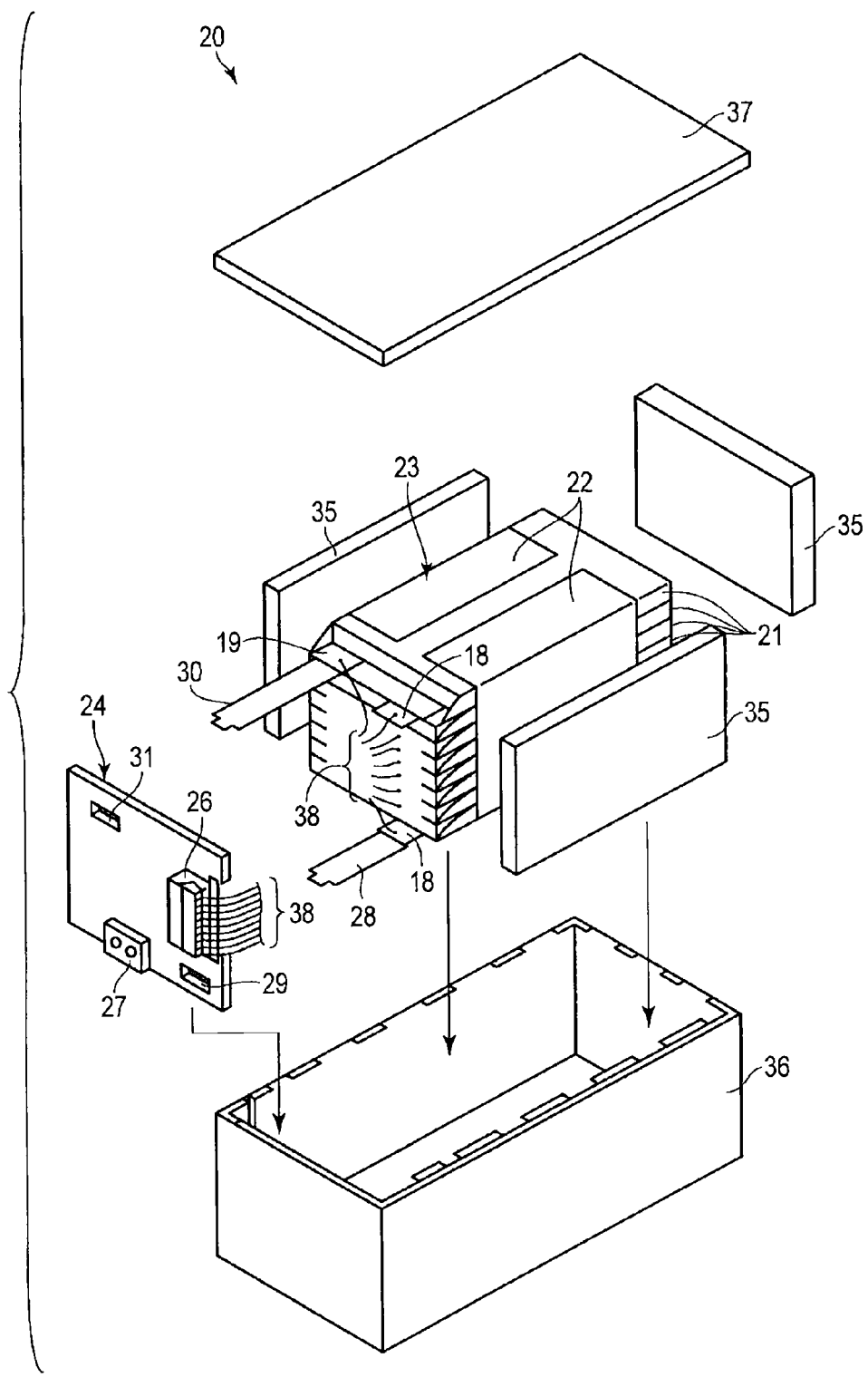
FIG. 6 is an exploded perspective view of a battery pack according to a second embodiment.
Figure 7:
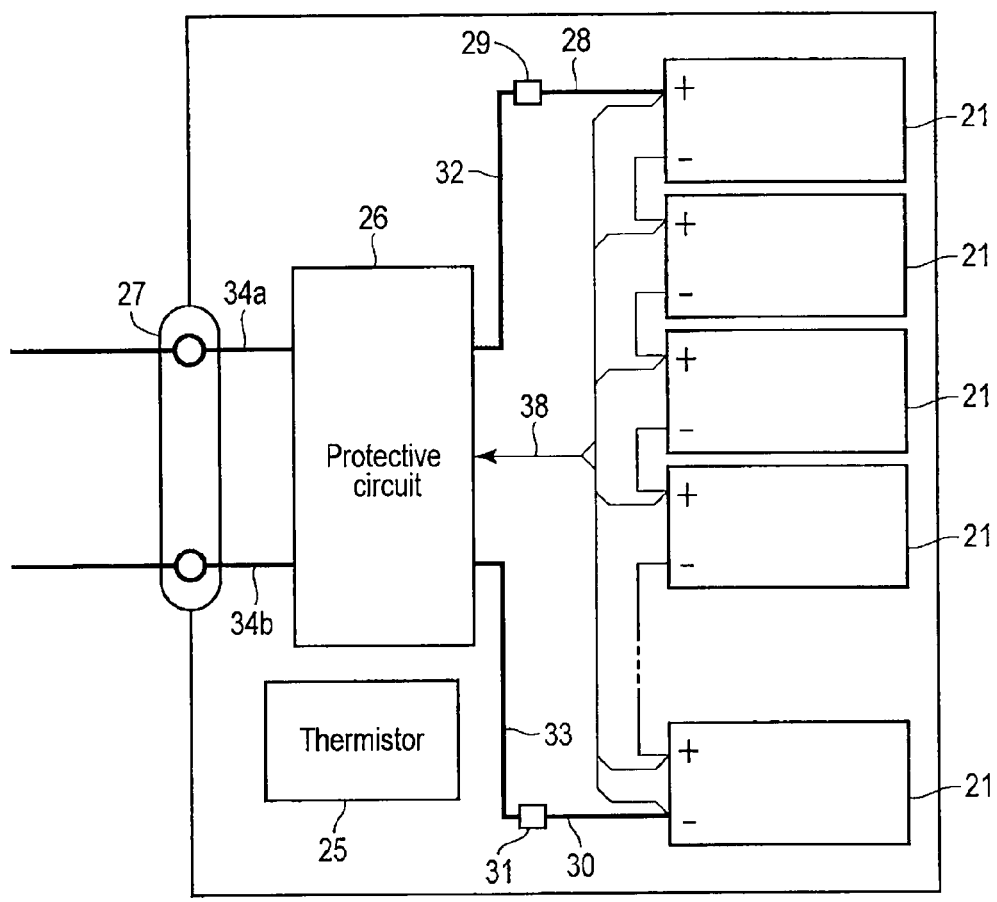
FIG. 7 is a block diagram showing an electric circuit of the battery pack of FIG. 6.

FIG. 6 and FIG. 7 show an example of a battery pack 20. This battery pack 20 comprises two or more flat-type unit cells 21. FIG. 6 is an exploded perspective view of the battery pack 20. FIG. 7 is a block pattern showing the electric circuit of the battery pack 20 shown in FIG. 6.

A plurality of unit cells 21 are laminated such that the externally extended positive electrode terminal 18 and negative electrode terminal 19 are arranged in the same direction and fastened with an adhesive tape 22 to thereby constitute a battery module 23. These unit cells 21 are electrically connected in series as shown in FIG. 7.

A printed wiring board 24 is disposed opposite to the side surface of the unit cell 21 from which the positive electrode terminal 18 and negative electrode terminal 19 are extended. As shown in FIG. 7, a thermistor 25, a protective circuit 26 and an energizing terminal 27 connected to external devices are mounted on the printed wiring board 24. An insulating plate (not shown) is attached to the surface of the printed wiring board 24 facing the battery module 23 to avoid unnecessary connection with the wiring of the battery module 23.

A positive electrode side lead 28 is connected to the positive electrode terminal 18 positioned on the lowermost layer of the battery module 23 and one end of the positive electrode side lead 28 is inserted into and electrically connected to a positive electrode side connector 29 of the printed wiring board 24. A negative electrode side lead 30 is connected to the negative electrode terminal 19 positioned on the uppermost layer of the battery module 23 and one end of the negative electrode side lead 30 is inserted into and electrically connected to a negative electrode side connector 31 of the printed wiring board 24. These connectors 29 and 31 are connected to the protective circuit 26 through wirings 32 and 33 formed on the printed wiring board 24.

The thermistor 25 is used to detect the temperature of the unit cell 21 and the detected signals are transmitted to the protective circuit 26. The protective circuit 26 can shut off a plus side wiring 34a and minus side wiring 34b between the protective circuit 26 and the energizing terminal 27 connected to external devices in a predetermined condition. The predetermined condition means, for example, the case where the temperature detected by the thermistor 25 is a predetermined one or higher. Also, the predetermined condition means, for example, the case of detecting overcharge, overdischarge and over-current of the unit cell 21. The detections of this overcharge and the like are made for individual unit cells 21 or whole unit cells 21. When individual unit cells 21 are detected, either the voltage of the battery may be detected or the potential of the positive electrode or negative electrode may be detected. In the latter case, a lithium electrode used as a reference electrode is inserted between individual unit cells 21. In the case of FIG. 6 and FIG. 7, a wiring 38 for detecting voltage is connected to each unit cell 21 and the detected signals are transmitted to the protective circuit 26 through these wirings 38.

The battery comprised in the battery pack of this embodiment is excellent in control of the potential of the positive electrode or the negative electrode by the cell voltage detection. Thus, a protective circuit which detects a cell voltage is preferably used.

A protective sheet 35 made of a rubber or resin is disposed on each of the three side surfaces of the battery module 23 excluding the side surface from which the positive electrode terminal 18 and negative electrode terminal 19 are projected.

The battery module 23 is accommodated in a container 36 together with each protective sheet 35 and printed wiring board 24. Specifically, the protective sheet 35 is disposed on each inside surface in the direction of the long side and on one of the inside surfaces in the direction of the short side of the container 36, and the printed wiring board 24 is disposed on the other inside surface in the direction of the short side. The battery module 23 is positioned in a space enclosed by the protective sheet 35 and the printed wiring board 24. A lid 37 is attached to the upper surface of the container 36.

Here, a thermally contracting tape may be used in place of the adhesive tape 22 to secure the battery module 23. In this case, after the protective sheet is disposed on both sides of the battery module and the thermally contracting tubes are wound around the battery module; the thermally contracting tape is contracted by heating to fasten the battery module.

The structure in which the unit cells 21 are connected in series is shown in FIG. 6 and FIG. 7. However, these unit cells may be connected in parallel to increase the capacity of the battery. The assembled battery packs may be further connected in series or in parallel.

Also, the structure of the battery pack is appropriately changed according to its use. The battery pack is preferably used in applications exhibiting excellent cycle performances when a large current is extracted. Specific examples of these applications include power sources for digital cameras, and power sources mounted on vehicles such as two- to four-wheel vehicles hybrid electric cars, two- to four-wheel electric cars and assist bicycles. The battery pack is preferably used for power sources mounted on vehicles.

According to the embodiment described above, there can be provided a battery pack having improved charge and discharge cycle performance without impairing the discharge capacity.

EXAMPLES

Example 1

Production of Positive Electrode

As the positive electrode active material, 90% by mass of lithium nickel cobalt manganese oxide ($LiNi_{0.8}Co_{0.1}Mn_{0.1}O_2$) powder was used. As the conductive agent, 5% by mass of acetylene black was used. As the binder, 5% by mass of polyvinylidene fluoride (PVdF) was used. These materials were added to N-methylpyrrolidone (NMP) and mixed to prepare a slurry. The slurry was applied to each surface of a current collector made of an aluminum foil having thickness of 15 µm. Then, the slurry was dried and pressed to obtain a positive electrode having an electrode density of 3.2 g/cm$^3$.

<Production of Negative Electrode>

As the first negative electrode active material, a monoclinic β-type titanium oxide having an average particle diameter of 15 µm was used. The monoclinic β-type titanium oxide was in the form of aggregate particle composed of fibrous primary particles which have an average fiber diameter of 0.1 µm and an average fiber length of 1 µm. The BET specific surface area, based on N$_2$ adsorption, was 18 m$^2$/g.

As the second negative electrode active material, granular particles of $Li_2SrTi_6O_{14}$ having a crystal structure belonging to a space group Cmca were used. The average particle diameter was 3 µm. The lithium ion inserted potential of $Li_2SrTi_6O_{14}$ is 1.45 V (vs. Li/Li$^+$).

100 parts by mass of the first negative electrode active material, 2 parts by mass of the second negative electrode active material, 10 parts by mass of acetylene black as the conductive agent, and 10 parts by mass of polyvinylidene fluoride (PVdF) as the binder were used. These materials were added to N-methylpyrrolidone (NMP) and mixed to prepare a slurry. The slurry was applied to each surface of a current collector made of an aluminum foil (purity: 99.99% by mass, average crystal grain size: 10 µm) having thickness of 15 µm. Then, the slurry was dried and pressed to obtain a negative electrode having an electrode density of 2.3 g/cm$^3$.

<Measurement of Lithium Ion Inserted Potential of Second Negative Electrode Active Material>

The lithium ion inserted potential of the second negative electrode active material was measured by the method described below.

100 parts by mass of the second negative electrode active material, 10 parts by mass of acetylene black and 10 parts by mass of polyvinylidene fluoride (PVdF) were added to N-methylpyrrolidone (NMP) and mixed to prepare slurry. An electrode was produced in the same manner as described above except that the slurry was used. The electrode was cut into a size of 2 cm×2 cm and used as a working electrode.

The working electrode was opposed to a counter electrode made of lithium metal foil having a size of 2.2 cm×2.2 cm interposing a glass filter (i.e., separator). Lithium metal was used as a reference electrode. These electrodes were placed in a tripolar system glass cell. Lithium metal was inserted into the cell in a manner that the lithium metal is not contacted with the working electrode and the counter electrode. The working electrode, the counter electrode, and the reference electrode are connected to a terminal of the glass cell. 25 mL of electrolytic solution was poured into the cell so as to fully impregnate the separator and the electrodes with the electrolytic solution. Then, the glass cell was sealed.

The electrolytic solution was prepared by dissolving 1M lithium hexafluorophosphate ($LiPF_6$) in a mixed solvent prepared by mixing ethylene carbonate and diethyl carbonate at a volume ratio of 1:2.

The produced glass cell was placed in a thermostat at 25° C. and the lithium ion inserted potential of the working electrode during charge at a current density of 0.1 mA/cm$^2$ was measured.

<Production of Electrode Group>

A positive electrode, a separator made of a polyethylene porous film having a thickness of 20 µm, a negative electrode, and another separator were stacked in this order and spirally wound. The resultant product was hot-pressed at 90° C. to obtain a flat-type electrode group having a width of 30 mm and a thickness of 3.0 mm. The obtained electrode group was put in a laminate film pack and vacuum-dried at 80° C. for 24 hours. The laminate film pack was formed with an aluminum foil having a thickness of 40 µm and a polypropylene layers having a thickness of 0.1 mm formed at each surface of the aluminum foil.

<Preparation of Liquid Nonaqueous Electrolyte>

A liquid nonaqueous electrolyte was prepared by dissolving 1 mol/L of $LiPF_6$ as an electrolyte in a mixed solvent prepared by mixing ethylene carbonate (EC) and diethyl carbonate (DEC) at a volume ratio (EC:DEC) of 1:2.

<Production of Nonaqueous Electrolyte Secondary Battery>

A nonaqueous electrolyte secondary battery having a structure shown in FIG. 2, a width of 35 mm, a thickness of 3.2 mm, and a height of 65 mm was produced by accommodating an electrode group in a laminated film pack, injecting a liquid nonaqueous electrolyte, and completely sealing the pack by heat sealing.

Examples 2 to 6, Comparative Example 1

Nonaqueous electrolyte secondary batteries were produced in the same manner as described in Example 1 except that the ratio A/B was changed as described in Table 1.

Examples 7 to 11

Nonaqueous electrolyte secondary batteries were produced in the same manner as described in Example 1 except that $MoO_2$ having a crystal structure belonging to a space group $P2_1/C$ was used as the second negative electrode active material and the ratio A/B was changed as described in Table 1.

Examples 12 to 17

Nonaqueous electrolyte secondary batteries were produced in the same manner as described in Example 1 except that the positive electrode active material and the second negative electrode active material were changed as described in Table 1.

<Charge/Discharge Cycle Test>

Cycle performance was evaluated using the batteries according to Examples 1 to 17 and Comparative example 1. Charge/discharge cycle test was carried out in an environment of 25° C. Charge/discharge operations make one cycle. Charge operation carried out at a constant current of 1 C and a constant potential of 2.8 V for 2 hours. Discharge operation carried out at a constant current of 1 C and a voltage of 1.5 V. The ratio (%) of the capacity at the 500th cycle to the capacity at the first cycle was calculated. The cycle test at 60° C. was performed in the same manner. The results are shown in Table 1.

when the ratio A/B was 20 or more, the capacity ratio after 500 cycles was high. Therefore, it is found that when the second negative electrode active material is present at a ratio higher than a certain ratio, the cycle performance is more significantly improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A nonaqueous electrolyte battery comprising:
a positive electrode;
a negative electrode; and
a nonaqueous electrolyte;
wherein the capacity per unit area of the negative electrode is larger than that of the positive electrode,
wherein the negative electrode comprises a first negative electrode active material comprising a monoclinic β-type titanium composite oxide and a second negative electrode active material, the second negative electrode active material causing insertion and release of lithium ion in a potential range from 0.8 V to 1.5 V relative to metallic lithium,
wherein a ratio AB of a mass A of the first negative electrode active material to a mass B of the second negative electrode active material is in a range from 1 to 20,

TABLE 1

| | Positive electrode active material | Second negative electrode active material | Potential (V) of second negative electrode active material | A/B | Capacity ratio (%) at 25° C. | Capacity ratio (%) at 60° C. |
|---|---|---|---|---|---|---|
| Comparative Example 1 | $LiNi_{0.8}Co_{0.1}Mn_{0.1}O_2$ | — | — | — | >90 | 0 |
| Example 1 | $LiNi_{0.8}Co_{0.1}Mn_{0.1}O_2$ | $Li_2SrTi_6O_{14}$ | 1.4 | 5 | >90 | >90 |
| Example 2 | $LiNi_{0.8}Co_{0.1}Mn_{0.1}O_2$ | $Li_2SrTi_6O_{14}$ | 1.4 | 100 | >90 | 30 |
| Example 3 | $LiNi_{0.8}Co_{0.1}Mn_{0.1}O_2$ | $Li_2SrTi_6O_{14}$ | 1.4 | 50 | >90 | 50 |
| Example 4 | $LiNi_{0.8}Co_{0.1}Mn_{0.1}O_2$ | $Li_2SrTi_6O_{14}$ | 1.4 | 20 | >90 | >90 |
| Example 5 | $LiNi_{0.8}Co_{0.1}Mn_{0.1}O_2$ | $Li_2SrTi_6O_{14}$ | 1.4 | 5 | >90 | >90 |
| Example 6 | $LiNi_{0.8}Co_{0.1}Mn_{0.1}O_2$ | $Li_2SrTi_6O_{14}$ | 1.4 | 1 | >90 | >90 |
| Example 7 | $LiNi_{0.8}Co_{0.1}Mn_{0.1}O_2$ | $MoO_2$ | 1.3 | 100 | >90 | 40 |
| Example 8 | $LiNi_{0.8}Co_{0.1}Mn_{0.1}O_2$ | $MoO_2$ | 1.3 | 50 | >90 | 55 |
| Example 9 | $LiNi_{0.8}Co_{0.1}Mn_{0.1}O_2$ | $MoO_2$ | 1.3 | 20 | >90 | >90 |
| Example 10 | $LiNi_{0.8}Co_{0.1}Mn_{0.1}O_2$ | $MoO_2$ | 1.3 | 5 | >90 | >90 |
| Example 11 | $LiNi_{0.8}Co_{0.1}Mn_{0.1}O_2$ | $MoO_2$ | 1.3 | 1 | >90 | >90 |
| Example 12 | $LiNi_{0.8}Co_{0.1}Mn_{0.1}O_2$ | CoO | 1.2 | 5 | >90 | >90 |
| Example 13 | $LiNi_{0.8}Co_{0.1}Mn_{0.1}O_2$ | CuO | 1.3 | 5 | >90 | >90 |
| Example 14 | $LiNi_{0.8}Co_{0.1}Mn_{0.1}O_2$ | $Fe_2O_3$ | 1.0 | 5 | >90 | >90 |
| Example 15 | $LiNi_{0.8}Co_{0.1}Mn_{0.1}O_2$ | NiO | 1.3 | 5 | >90 | >90 |
| Example 16 | $0.6Li_2MnO_3$—$0.4LiNi_{0.5}Mn_{0.5}O_2$ | $Li_2SrTi_6O_{14}$ | 1.4 | 5 | >90 | >90 |
| Example 17 | $0.6Li_2MnO_3$—$0.4LiNi_{0.5}Mn_{0.5}O_2$ | $MoO_2$ | 1.3 | 5 | >90 | >90 |

For the battery according to Comparative example 1, the capacity ratio after the 500th cycle at 60° C. is 0. This shows that the capacity was significantly reduced under high temperature. On the other hand, for the batteries according to Examples 1 to 17, the capacity ratio after 500 cycles at 60° C. was significantly higher than that of Comparative example 1. Therefore, when the second negative electrode active material was used in the negative electrode according to the embodiment, it was shown that the cycle performance under high temperature was significantly improved. Particularly, and wherein the second negative electrode active material is selected from:
a transition metal-containing oxide selected from the group consisting of a titanium-containing oxide having a crystal structure belonging to a space group Cmca and an oxide containing one or more elements of Fe, Co, Ni, Cu, or Mo, and
a titanium-containing oxide represented by a formula of $Li_{2+x}A_yTi_6O_{14}$, wherein A represents at least one element selected from the group consisting of Na, K, Mg, Ca, Ba, and Sr, and x and y satisfy relationships represented by inequalities of $0 \leq x \leq 5$ and $1 \leq y \leq 2$, respectively.

2. The battery according to claim 1,
wherein the second negative electrode active material is a transition metal-containing oxide selected from the group consisting of a titanium-containing oxide having a crystal structure belonging to a space group Cmca and an oxide containing one or more elements of Fe, Co, Ni, Cu, or Mo.

3. The battery according to claim 1,
wherein the second negative electrode active material is a titanium-containing oxide represented by a formula of $Li_{2+x}A_yTi_6O_{14}$, wherein A represents at least one element selected from the group consisting of Na, K, Mg, Ca, Ba, and Sr, and x and y satisfy relationships represented by inequalities of $0 \leq x \leq 5$ and $1 \leq y \leq 2$, respectively.

4. The battery according to claim 1,
wherein the positive electrode comprises a lithium composite oxide containing nickel.

5. The battery according to claim 1,
wherein the positive electrode comprises a lithium-containing composite oxide represented by a formula of $xLi_2MeO_3$-$(1-x)LiMe'O_2$, wherein x satisfies the relationship represented by the inequality of $0<x<1$, and Me and Me' independently represent at least one element selected from the group consisting of Mn, Ti, Zr, V, Cr, Fe, Co, Ni, Cu, Al, Mg, Zr, B, and Mo.

6. A battery pack comprising:
the nonaqueous electrolyte battery according to claim 1; and
a container accommodating the battery.

7. The battery according to claim 1, wherein an average particle diameter of the monoclinic β-type titanium composite oxide is 3 μm or less.

8. The battery according to claim 1, wherein an average particle diameter of the monoclinic β-type titanium composite oxide is 0.03 μm or more.

9. The battery according to claim 1, wherein a specific surface area of the monoclinic β-type titanium composite oxide is from 5 to 50 m$^2$/g when it is measured by the BET adsorption method by $N_2$ adsorption.

10. The battery according to claim 1, wherein a porosity of the negative electrode is in a range of 20 to 50%.

11. The battery according to claim 1, wherein the second negative electrode active material is a titanium-containing oxide represented by a formula of $Li_{2+x}A_yTi_6O_{14}$, wherein A represents at least one element selected from the group consisting of Na, K, Mg, and Ca and x and y satisfy relationships represented by inequalities of $0 \leq x \leq 5$ and $1 \leq y \leq 2$, respectively.

* * * * *